United States Patent
Elovici et al.

(10) Patent No.: US 9,659,185 B2
(45) Date of Patent: May 23, 2017

(54) METHOD FOR DETECTING SPAMMERS AND FAKE PROFILES IN SOCIAL NETWORKS

(71) Applicant: B.G. Negev Technologies and Applications Ltd., Beer Sheva (IL)

(72) Inventors: Yuval Elovici, Moshav Arugot (IL); Michael Fire, Netanya (IL); Gilad Katz, Rehovot (IL)

(73) Assignee: B.G. Negev Technologies and Applications Ltd., Beer Sheva (IL)

( * ) Notice: Subject to any disclaimer, the term of this patent is extended or adjusted under 35 U.S.C. 154(b) by 66 days.

(21) Appl. No.: 14/386,769

(22) PCT Filed: Mar. 21, 2013

(86) PCT No.: PCT/IL2013/050278
§ 371 (c)(1),
(2) Date: Sep. 19, 2014

(87) PCT Pub. No.: WO2013/140410
PCT Pub. Date: Sep. 26, 2013

(65) Prior Publication Data
US 2015/0082448 A1    Mar. 19, 2015

Related U.S. Application Data

(60) Provisional application No. 61/614,006, filed on Mar. 22, 2012.

(51) Int. Cl.
*G06F 21/62* (2013.01)
*G06Q 10/10* (2012.01)
*G06Q 50/00* (2012.01)

(52) U.S. Cl.
CPC ....... *G06F 21/6245* (2013.01); *G06Q 10/107* (2013.01); *G06Q 50/01* (2013.01)

(58) Field of Classification Search
CPC ............... H04L 63/1483; H04L 67/306; H04L 63/1425; H04L 63/1491; G06F 21/6245; G06Q 10/107; G06Q 50/01
See application file for complete search history.

(56) References Cited

U.S. PATENT DOCUMENTS

| 2008/0132251 A1* | 6/2008 | Altman | G06Q 30/0207 455/457 |
| 2011/0191200 A1* | 8/2011 | Bayer | G06Q 20/12 705/26.1 |

OTHER PUBLICATIONS

Wang2, Don't Follow Me, Proceedings of 5th International Conference on Security and Cryptography (SECCRYPT), 2010.*
Yang et al., Die Free or Live Hard, RAID 2011, LNCS 6961, pp. 318-337, 2011, Springer-Verlag Berlin Heidelberg 2011.*

(Continued)

*Primary Examiner* — Saleh Najjar
*Assistant Examiner* — Shu Chun Gao
(74) *Attorney, Agent, or Firm* — Fenwick & West LLP

(57) ABSTRACT

A method for protecting user privacy in an online social network, according to which negative examples of fake profiles and positive examples of legitimate profiles are chosen from the database of existing users of the social network. Then, a predetermined set of features is extracted for each chosen fake and legitimate profile, by dividing the friends or followers of the chosen examples to communities and analyzing the relationships of each node inside and between the communities. Classifiers that can detect other existing fake profiles according to their features are constructed and trained by using supervised learning.

10 Claims, 5 Drawing Sheets

(56) References Cited

OTHER PUBLICATIONS

Wang, Detecting Spam Bots in Online Social Networking Sites, Data and Applications Security XXIV, LNCS 6166, pp. 335-342, 2010.*

Nagle et al., Can friends be trusted, Advances in Social Network Analysis and Mining, 2009.*

Rad et al., Towards Detecting Influential Users in Social Networks, MCETECH 2011, LNBIP 78, pp. 227-240, 2011, Springer-Verlag Berlin Heidelberg 2011.*

Acquisti, A. et al., "Imagined Communities: Awareness, Information Sharing, and Privacy on the Facebook", PET, 2006, pp. 1-22.

Boshmaf, Y. et al., "The Socialbot Network: When Bots Socialize for Fame and Money", ACSAC '11, Proceedings of the 27th Annual Computer Security Applications Conference, ACM, 2011, pp. 93-102.

Bosma, M. et al. "A Framework for Unsupervised Spam Detection in Social Networking Sites", Lecture Notes in Computer Science vol. 7224, 2012, pp. 364-375.

Debarr, D. et al., "Using Social Network Analysis for Spam Detection", Advances in Social Computing, SBP 2010, LNCS 6007, Chai, S.K. et al. (eds.), 2010, pp. 62-69.

Feizy, R. et al., "Are Your Friends Who They Say They Are?: Data Mining Identities," Crossroads—The Social Web Crossroads Homepage archive, Dec. 31, 2009, pp. 19-23, vol. 16, Issue 2.

Kontaxis, G. et al., "Detecting Social Network Profile Cloning", PERCOM Workshops, 2011 IEEE International Conference IEEE, pp. 295-300.

Lee, K. et al., "Uncovering Social Spammers: Social Honeypots+Machine Learning", In Proceedings of SIGIR '10, 2010, 8 pages.

Stringhini, G. et al., "Detecting Spammers on Social Networks", ACSAC '10, Proceedings of the 26th Annual Computer Security Applications Conference 2010, ACM, pp. 1-9.

Wang, A.H., Don't Follow Me: Spam Detection in Twitter, Security and Cryptography (SECRYPT), in: Proceedings of the 2010 International Conference on. IEEE, 2010, pp. 1-10.

\* cited by examiner

METHOD FOR DETECTING SPAMMERS AND FAKE PROFILES IN SOCIAL NETWORKS

FIELD OF THE INVENTION

The present invention relates to the field of social networks. More particularly, the invention relates to a method for detecting spammers and fake profiles in social networks.

BACKGROUND OF THE INVENTION

In recent years, online social networks have grown rapidly and today offer users endless possibilities for publicly expressing themselves, communicating with friends, and sharing information with people across the world. A recent survey estimated that 65% of adult internet users interface with online social network sites.

Online social networks allow users to communicate with one another for various personal and professional purposes. Those users that have been identified by another user as a person with whom there is a preference to grant access to personal information are considered "friends". After a friendship has been established, a friend is able to access multimedia information posted in an account of the user that granted the friendship.

Due to the friendly nature of social networks such as Facebook, users tend to disclose many personal details about themselves and about their connections. Moreover, Bosmaf et al ("The socialbot network: when bots socialize for fame and money", Proceedings of the 27th Annual Computer Security Applications Conference. ACM, 2011, pp. 93-102) discovered that an average of 80% of studied Facebook users accepted friend requests from people they do not know if they share more than 11 mutual friends.

In many cases, accepting a friend request from strangers may result in exposure of a user's personal information to unknown third parties. In addition, personal user information can be exposed to third party applications running on the social network. Another privacy concern deals with existing privacy settings which, for the majority of users, do not match security expectations. Accordingly, many users accidently or unknowingly publish private information, leaving them more exposed than they thought.

If a user's personal information is disclosed to a third malicious party, the personal information can be used to threaten the user both online and in the real world. For example, a malicious user can use the gained personal information and send customized spam messages to the user in an attempt to lure such users onto malicious websites or blackmail them into transferring money to the attacker's account.

In recent years, online social network such as Facebook, Twitter, Google+, MySpace, BEBO, and ACADEMIA.EDU have been growing at exponential rates and serving hundreds of millions of users on a daily basis. The Facebook social network, for example, was founded in 2004 and had more than 845 million monthly active users at the end of December 2011. Facebook users averagely have 130 friends and create 90 pieces of content each month. Due to the sharing nature of online social networks, users expose many personal details about themselves. Details, such as date of birth, email address, high school name and even their phone numbers are frequently exposed.

The existing attacks include identity-theft, user de-antonymization, inferring attacks, viruses, click-jacking, phishing, reverse social engineering and social bots. Cybercriminal attackers can use a combination of attacks in order to collect users' personal information and gain their trust. By using the user's collected personal information, an attacker can send personally crafted spam messages in order to lure these users into malicious websites, or even blackmail them to transfer money to the attacker's account. In some cases, the attacker can be an online "predator", using online attacks in order to gain information that will enable him to obtain the user's trust and convince the user to meet him in the real world.

In order to cover their tracks, social network attackers can use fake profiles. In fact, the number of fake profiles on Facebook can number tens of millions.

Social Networks Threats

Today, an average user spends more time on popular social networking sites than on any other site. With the increasing usage of online social networks, they have become fertile ground for spammers, cybercriminals, and many other threats. These threats put social networks users at risk due to the fact that the users of these networks tend to publish personal information about themselves. This information is sensitive and may cause serious harm if obtained by the wrong people. A research carried out (by Acquisti et al: "Imagined Communities: Awareness, Information Sharing, and Privacy on the Facebook", 2006) evaluated the amount of personal information exposed by users on Facebook and concluded that many Facebook users disclose personal information about themselves.

Another disturbing fact was that around 80% of Facebook users accept friend requests from people they do not know if they have more than 11 mutual friends. By accepting these friendship requests, users disclose their private information to strangers. Moreover, by accepting friendship requests from strangers, users can expose their friends to inference attacks.

Fake profiles have been detected in real online social networks that use the social networks as a platform for collecting users' data (also known as Friend Infiltrators), spammers and even distributers of sexual content (also known as Pornographic Storytellers).

In recent years, social networks users have been exposed to additional types of attacks. These attacks include:
a) viruses which use the social networks as convenient spreading platforms
b) click-jacking attacks that try to hijack the user's web sessions
c) phishing attacks that try to fraudulently acquire a user's sensitive information by impersonating a trustworthy third party
d) spammers that uses the user's social network data in order to send tailored spam messages to the user
e) user de-anonymization attacks that attempt to expose the identity of the user
f) social-bots, consisting of a massive group of fake profiles which aim to harvest users' personal data
g) clones and identity theft attacks, where the attackers duplicate a user's online presence in the same network or across different networks in order to mock the cloned user's friends by forming a trusting relation with the cloned profile. Online "predators" can also use social networks as a platform for finding their next victim. They attempt to do so by collecting personal information, gaining trust, and arranging an encounter in the real world.

Several solutions have been proposed by security companies, social networks operators, and by academic researchers In order to overcome these threats. Social networks operators try to protect their users by adding authentication processes in order to ensure that the registered user is a real person. Many social network operators also support a configurable user privacy setting that enables users to protect their personal data from other users on the network. Additional protection includes defense means against spammers, fake profiles, scams, and other threats. For example, Facebook users can report about abuse or policy violation attempts by other users in the network. In some countries, social networks such as Facebook and BEBO also added a "Panic Button" in order to better protect young people from other users on the social network. Security companies such as CheckPoint Software Technologies Ltd (Tel Aviv, Israel) and UnitedParents offer users of social networks tools to protect themselves. For example, the Checkpoint's Social-Guard software aims to protect users from cyberbullies, predators, dangerous links, and strangers on Facebook.

Several attempts were made to propose solutions to different social networks threats. DeBarr et al ("Using social network analysis for spam detection", Advances in Social Computing 2010, pp. 62-69) used the graph centrality measure in order to predict whether a user is likely to send spam. Wang ("Don't follow me: Spam detection in twitter, Security and Cryptography (SECRYPT), Proceedings of the 2010 International Conference on, IEEE, pp. 1-10) proposed a method to classify spammers on Twitter by using content and graph based features.

Bosma et al. ("A framework for unsupervised spam detection in social networking sites", Lecture Notes in Computer Science Volume 7224, 2012, pp. 364-375) proposed a spam detection framework, based on the HITS web link analysis framework. Stringhini et al ("Detecting spammers on social networks", Proceedings of the 26th Annual Computer Security Applications Conference 2010, ACM, pp. 1-9) proposed a solution for detecting spammers in social networks and suggested a way for detecting spammers on Twitter, Facebook and MySpace social networks by using "honey-profiles". Stringhini et al also proposed a method for detecting spammer profiles by using supervised learning algorithms. Lee et al presented a method for detecting social spammers of different types by using honey-pots combined with machine learning algorithms. Kontaxis et al ("Detecting social network profile cloning", PERCOM Workshops, 2011 IEEE International Conference IEEE, pp. 295-300) proposed a method for detecting social network profile cloning by designing and implementing a prototype that can be employed by users and assist in investigating whether the users have fallen victim to clone attacks.

It is therefore an object of the present invention to provide a method for effectively detecting spammers and fake profiles in social networks.

Other objects and advantages of the invention will become apparent as the description proceeds.

SUMMARY OF THE INVENTION

The present invention is directed to a method for protecting user privacy in an online social network, according to which negative examples of fake profiles and positive examples of legitimate profiles are chosen from the database of existing users of the social network. Then, a predetermined set of features is extracted for each chosen fake and legitimate profile, by dividing the friends or followers of the chosen examples to communities and analyzing the relationships of each node inside and between the communities. Classifiers that can detect other existing fake profiles according to their features are constructed and trained by using supervised learning.

Negative examples of fake profiles may be obtained by using simulation of fake profiles infiltration which is done automatically, while positive examples of legitimate profiles may be chosen from the database of existing users of the social network. Fake profiles in the social network may be identified by representing the social network as a directed graph. These classifiers may be trained for each of the positive and negative example generating a features vector for each user profile. The features vectors are used as a training set for the fake profiles detection classifiers.

Positive fake profile examples may be obtained by using random friend requests and negative examples of fake profiles may be obtained by randomly choosing legitimate profiles from the social network.

A subset of the most likely fake profiles may be manually evaluated, while using a set of randomly selected profiles as a control group.

The simulation of fake profiles infiltration in a directed social network may be performed by:
a) representing the topology of the directed social network by a directed graph;
b) inserting new nodes to the graph, each of which representing a fake profile; and
c) inserting each fake profile into the graph by simulating sending a series of "follow" requests to random users on the directed social network, while limiting the number of friend requests that can be sent by each fake profile.

The set of features that is extracted for each user may consist of:
a) the number of friends of the user;
b) the number of communities the user is connected to;
c) the number of connections between the friends of the user; and
d) the average number of friends inside each of the user's connected communities.

Fake profiles detection classifiers may be constructed by:
a) automatically creating a subset of positive and negative examples with different sizes from each social network;
b) for each social network, removing users having a number of friends which is smaller than a predetermined value; and
c) randomly choosing negative examples from each social network.

DETAILED DESCRIPTION OF PREFERRED EMBODIMENTS

Figure 1:
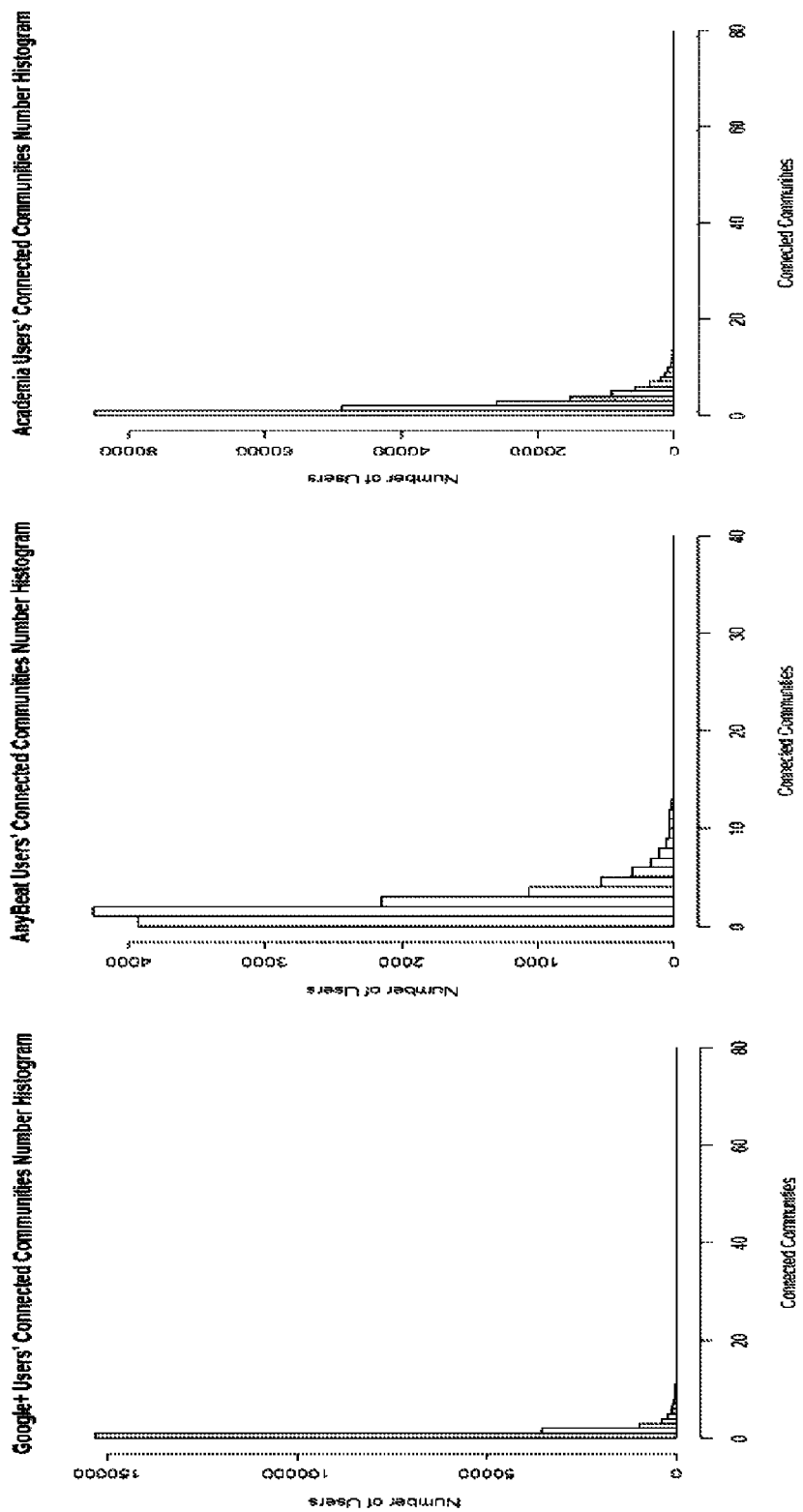
FIG. 1 shows the distribution of the number of communities, to which each user is connected, in each evaluated social network.

Social have a community structure network and are scale-free (i.e., obey the power law degree distribution $P(k) \sim ck^{-\gamma}$, where some node degrees greatly exceed the average. In addition, the nodes of such a network can be grouped into sets such that each set of nodes is densely connected internally.

The present invention uses a community (or group) detection algorithm (in this specific example, the Louvain method) that attempts to optimize the "modularity" of a partition of the network has been used for splitting each of the examined social networks into communities and extract relevant features from them. Once the splits are done, various attributes have been extracted and used to train classifiers. Other detection algorithms may also be used for community detection.

The present invention proposes a process for the detection of spammers and fake profiles in social networks, which is based solely on the topology of the social network, detects users who connect randomly to others by detecting anomalies in that network's topology. Since social networks are scale-free and have a community structure, most of the users in the network have a small degree and are connected only to a small number of communities. On the other hand, fake profiles tend to establish friendship connections with users from different communities.

According to the process proposed by the present invention, examples of fake profiles (negative examples) and legitimate profiles (positive examples) are chosen from the database of existing users of the social network. Then, a predetermined set of features is extracted for each chosen fake and legitimate profile by dividing the friends or followers of the chosen examples to "communities" and analyzing the "relationships" of each node in and between these communities. Then, the extracted features are used in a supervised learning process to construct and train classifiers that can detect other existing fake profiles according to their features.

The proposed process may be further improved by using simulation of fake profiles infiltration (negative examples) which is done automatically, while legitimate profiles (positive examples) are chosen from the database of existing users of the social network. The rest of the process (features extraction and training classifiers) is performed similarly.

According to one embodiment, at the first step, the inherent knowledge of the social network about existing profiles is used for selecting positive and negative examples of fake profiles. Alternatively, a code simulates a single fake user's infiltration effort into the social network. At the next step, supervised learning is used to detect the simulated fake profiles and other real profiles with similar features over the social networks. Then the results were manually evaluated by experts.

The proposed process has been found effective for detecting other interesting types of users that use the social network in order to connect to random users, such as users that use the social networks only as dating platform, on which they only connect with random users from a specific gender.

In one embodiment, fake profiles in social networks have been identified by applying methods from the domain of graph theory and supervised learning, during which a set of positive and negative examples has been obtained, in order to train classifiers. Generally, obtaining negative examples of fake profiles is a relatively easy task due the fact that in most cases, social network users are legitimate. However, obtaining positive examples of fake profiles is not an easy task due to the fact that many of them tend to camouflage themselves as legitimate profiles. Therefore, in order to obtain positive examples of fake profiles, the code simulated the infiltration of fake users into the social networks by using random friend requests. Then, the simulated fake profiles has been used as positive examples. It is also possible to use positive examples of fake profiles taken from the database of the social network, rather than obtaining fake profiles using simulation.

Random legitimate profiles have been chosen from the network as negative examples. For each of the positive and negative example, a features vector has been extracted. The features vectors have been used as a training set for the fake profiles detection classifiers. Then, the classifiers have been used to detect other existing profiles in the social networks which were suspected, with high probability of being fake. A team of experts has been used to manually evaluate a subset of the most likely fake profiles, while using a set of randomly selected profiles as a "control group".

Simulation of Fake Profiles Infiltration

Positive examples for the classifiers have been have been created by a code which simulates the infiltration of a single fake user (or a group of fake users) into directed social networks that (in which each friend request was a "follow" request that did not need to be accepted in order to become active. Directed social networks can be represented by a directed graph). For each social network, the simulation process loaded the topology graph and inserted a plurality of new nodes (for example, 100 new nodes) which represented fake users into the graph.

The insertion process of each fake profile into the graph was done by simulating the behavior of a fake profile that sends friendship requests to users of a non-directed social network (such as Facebook) or by simulating a series of "follow" requests being sent to random users on a directed social network (such as Twitter). Each fake user had a limited number of friend requests, in order to comply with the practical reality, in which many social networks limit the number of user requests allowed for new members (for the purpose of blocking spammers and social bots).

In this case, the social networks (Academia.edu, AnyBeat and Google+) were directed. Therefore, in order to create different types of fake users in directed social networks, the number of follow request of each user has been randomized to be between 10 and 250.

Features Extraction

After obtaining a set of positive and negative user examples, a small set of features has been extracted from each user (sample). For each user, the following four features have been extracted:

a) the degree of the user
b) the number of communities the user is connected to
c) how many connections exist among the friends of the user
d) the average number of friends inside each of the users connected communities.

If $G=\langle V,E \rangle$ is a directed graph which represents a social network topology and C is the disjoint sets of all communities in G after G was partitioned into communities by using the Louvian method ($V = U_{C^* \in C} U_{u \in C^*} u$), the following features were defined for each $u \in V$:

The user degree is defined by $d(u) := |\Gamma(u)|$, where $\Gamma(u)$ is the neighborhood of u and is defined by:

$$\Gamma(u) := \{v | (u,v) \in E \text{ or } (v,u) \in E\}$$

The users' connected communities' number is given by:

$$\text{cocommunities}(u) := |\{C^* \in C | v \in C^* \text{ and } v \in \Gamma(u)\}|$$

3. The number of connections between u's friends is given by:

$$f\text{connections}(u) := |(x,y) \in E | x \in \Gamma(u) \text{ and } y \in \Gamma(u)|$$

4. The average number of friends inside connected communities is given by:

$$\text{avg-friends-comm}(u) := \frac{d(u)}{cocommunities(u)}$$

Since fake profiles tend to be connected to random users from different communities, fake users have a high number of connected communities. Due the fact that fake users chose to follow random users, the chances that the connected users know each other are low. Therefore, the value of friends-connections is predicted to be low.

Fake profiles detection classifiers were constructed by creating a subset of positive and negative examples with different sizes from each social network. First, the fake profiles created by the code have been used as a positive example in the simulation. Then, for each social network, some of the users, including some of the fake ones, were filtered out. The users that were removed were with a small number of friends, as they did not impose a serious threat to a large number of users in the networks. Then, randomly negative examples have been chosen from each social network. At the end of this process, the following training set has been obtained, for each of the following social networks:

Academia.edu: In Academia.edu, all the users with a degree less than 21 have been removed, leaving 23,759 users (the absolute majority of the members in the network). The training set was constructed from 93 positive and 2,999 negative examples.

AnyBeat: In AnyBeat, which is a relatively new and small social network, users with a degree less than 6 have been removed, such that an overall number of 3,208 users were left. The training set was constructed from 100 positive and 499 negative examples.

Google+: In Google+, none of the users has been removed due the fact that only a small partition of the network was obtained. The training set was constructed from 100 positive and 3,000 negative examples.

Classifiers were constructed for the different social networks using the WEKA software, along with the training set extracted from each social network. For each social network, both a decision tree (J48) and Naive Bayes classifiers were constructed. These simple classifiers were used in order to detect fake profiles inside the social networks.

The constructed classifiers have been evaluated by two ways. First, a 10-fold cross validation has been used to determine how well each classifier is capable of identifying the made-up fake profiles in the training sets. Secondly, attempts were made to determine whether or not the classifier was right in flagging some "original" social network profiles as fake. In addition to these "suspected" profiles, a list of randomly selected profiles has also been chosen as a control group. These two lists, both of the same length, were combined into one list with random ordering. The final list was sent to a team of experts for evaluation.

The fake profile detection process has been evaluated on three different directed social networks datasets: Academia.edu, AnyBeat, and Google+. Each one of the data sets mentioned above has a different size and different anonymity level.

Academia.edu is a platform for academics to share and follow research papers. Members upload and share their papers with other researchers in over 350,000 research interests. An Academia.edu, social network members may choose to follow any of the network's members, hence the directed nature of the links. The detection process has been evaluated on a major part of the network topology, containing more than 200,000 users and almost 1.4 million links. The Academia.edu network topology was obtained by using a dedicated web crawler. Due to the nature of the social network, many users provide their first and last name in addition to their academic affiliation. Therefore, the level of user anonymity in this network is low.

AnyBeat is an online community, a public gathering place where a user can interact with people from around your neighborhood or across the world. AnyBeat is a relatively new social network in which members can log in without using their real name, and members can follow any other member in the network. The proposed detection process has been evaluated on a major part of the network's topology, which was obtained using a dedicated web crawler. The topology contained 12,645 users and 67,053 links. AnyBeat users enjoy high anonymity and connections to strangers are common. Therefore, it is relativity easy to activate fake profiles and connected to other users.

Google+ is an online social network operated by Google. Google+ is a directed social network that has more than 90 million users. Every user can login using his real name or a user name and organize his contacts into circles, which are groups for sharing information. The proposed detection process has been evaluated on a sub-graph of the network, which contained more than 211,187 users and 1,506,896 links. All data was obtained by a dedicated crawler, which collected publicly available data from each profile. Google+ users have a medium anonymity level where it is typical for a user to use his real name, but made-up names are also common.

Table 1 shows Social Networks Datasets for Academia.edu, AnyBeat and Google+

TABLE 1

Social Networks Datasets

|  | Academia.edu | AnyBeat | Google+ |
| --- | --- | --- | --- |
| Nodes Num. | 200K | 12.6K | 211K |
| Links Num. | 1.4M | 67K | 1.5M |
| Anonymity | Low | High | Medium |
| Date | 2011 | 2012 | 2012 |

FIG. 1 shows the distribution histograms of the number of communities, to which each user is connected, in each evaluated social network.

The classifiers results have been evaluated in two ways. First, each classifier has been evaluated on the training set using 10 folds cross-validation. For each classifier, false positive rates, f-measure, and AUC (area under the ROC curve) has been measured, in order to evaluate the classifiers performance (As shown in Table 2).

TABLE 2

Classifiers 10 Folds Cross Validation Results

| Social Network | Classifier | False Postive | F-Measure | AUC |
| --- | --- | --- | --- | --- |
| Academia.edu | J48 | 0.052 | 0.967 | 0.983 |
| Academia.edu | Naive Bayes | 0.063 | 0.995 | 0.999 |
| AnyBeat | J48 | 0.026 | 0.99 | 0.992 |
| AnyBeat | Naive Bayes | 0.126 | 0.968 | 0.982 |
| Google+ | J48 | 0.01 | 0.999 | 0.995 |
| Google+ | Naive Bayes | 0.01 | 0.993 | 1 |

Then, the classifiers have been used to identify other users in the social network who have a high probability of being either fake or spammer profiles. Using a decision tree (J48) classifier, 19 "suspected" profiles were detected in Academia.edu, 23 profiles in AnyBeat, and 283 profiles in Google+. The list of "suspected" profiles was combined with a list of an equal size of randomly selected profiles designed to act as a control group. The only limitation on the random profiles selection was that they must have a minimum number of friends (the exact number depended on the size of the network). In Academia.edu, each chosen random profile had to have at least 21 friends, in Anybeat the number was 6, and in Google+ the number was 1. The ordering of the lists was created using a random numbers generator and each user was evaluated by three of the experts mentioned above.

The evaluation showed that some of the profiles which were flagged the proposed detection process have already been removed by the social network administrator. One example was found in Academia.edu, where a user named "Bilbo Baggins" from Oxford University was removed prior to the evaluation.

The results were evaluated by comparing the number of profiles in each group (flagged and control) that received a "score" greater or equal to 1.5 (meaning, that the majority of experts declared them as illegitimate).

Results:

Acadeima.edu:

The J48 decision tree classifier had indicated that 21 profiles had a high probability of being fake. Some of these profiles had been removed from the social network before the evaluation began, leaving 15 valid profiles. The profiles indicated by the J48 classifier got an average score of 1, while the profiles in the random group got an average score of 0.166. Moreover, 7 (46.6%) of the 15 flagged profiles got a score equal or higher than 1.5 points, compared with 0 in the control group.

AnyBeat:

The J48 decision tree classifier flagged 23 profiles as having a high probability of being fake. One of these profiles has already been removed from the network, leaving 22 profiles to analyze. The experts found that 7 (31.8%) of the 22 profiles received a score equal or higher than 1.5 points, compared to only 4 (20%) of the profiles in the control group. Moreover, 14 (63.6%) of the profiles in the group indicated by the J48 classifier were following other users of a specific gender, compared with only 7 (35%) in the control group.

Figure 2:
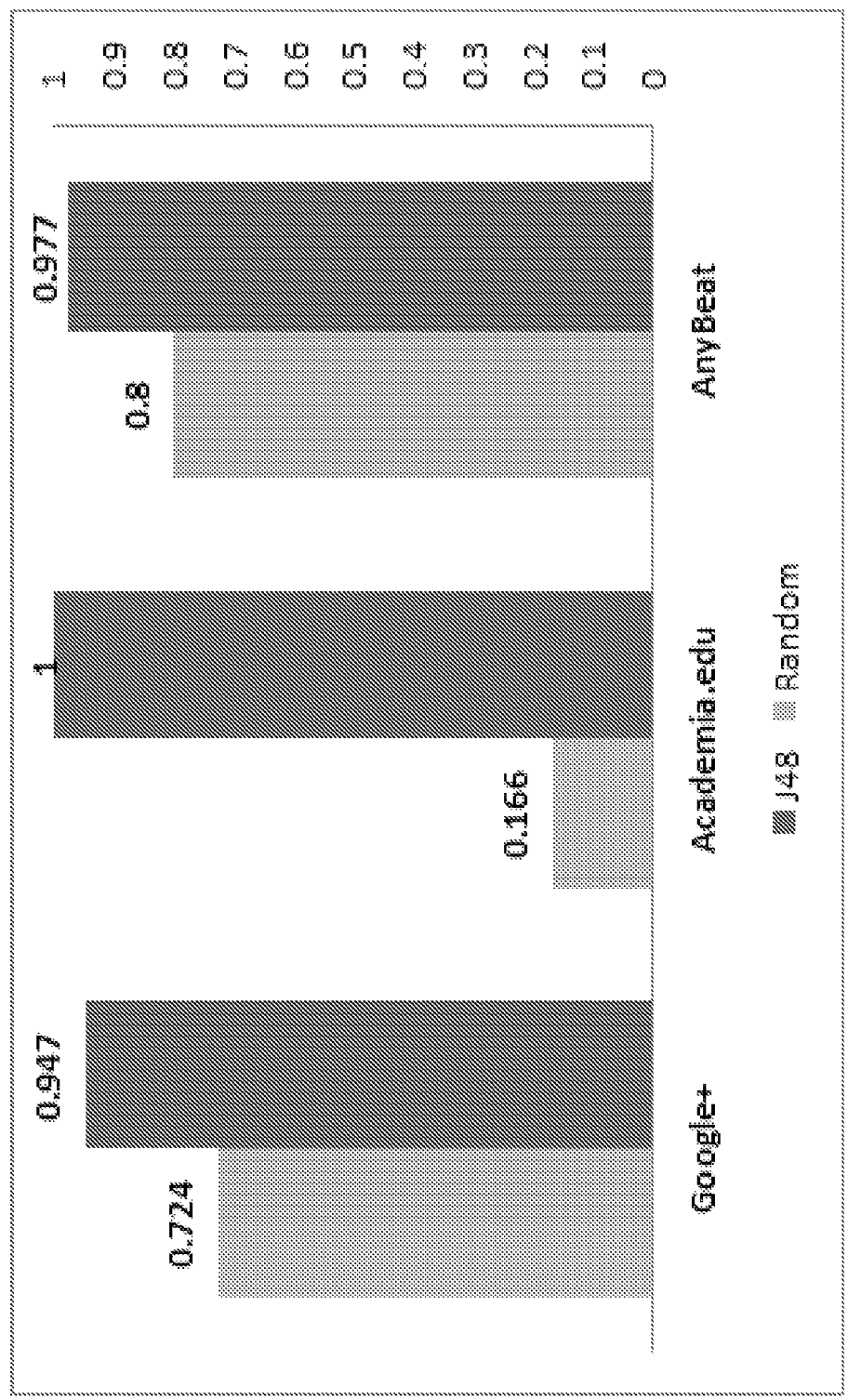
FIG. 2 shows the resulting average fake profiles' scores.

Google+:

In this network the proposed detection process has been evaluated on the top 50 flagged results. Three of these flagged profiles had already been removed or blocked before the evaluation began, leaving 48 profiles to analyze. Of these profiles 17 (35.4%) received a score higher or equal to 1.5 points, compared with only 10 (20.4%) of the control group. In addition, the experts concluded that 16 (33.3%) of the 48 flagged profiles may be spammers, compared with only 4 (8.1%) in the control group. With regard to the final research question, users who only follow users of a specific gender, the results were 2 (4.1%) and 0 for the flagged users and the control group, respectively. The resulting average fake profiles' scores for a decision tree (J48) classifier and random selection, are shown in FIG. 2.

The proposed detection process has been evaluated and varies with each network, as shown in Table 3.

TABLE 3

The Summary of the Experts' Results for Each Social Network

| Social Network | Question | Group | #Profiles | Scores Sum | Profiles with score ≥1.5 |
|---|---|---|---|---|---|
| AnyBeat | Is Profile Fake? | J48 | 22 | 21.5 | 7 |
| AnyBeat | Is Profile Fake? | Random | 20 | 16 | 4 |
| AnyBeat | Is Profile Spammer? | J48 | 22 | 1 | 0 |
| AnyBeat | Is Profile Spammer? | Random | 20 | 8 | 2 |
| AnyBeat | Is Following Specific Gender? | J48 | 22 | 28 | 14 |
| AnyBeat | Is Following Specific Gender? | Random | 20 | 16.5 | 7 |
| Academia.edu | Is Profile Fake? | J48 | 15 | 15 | 7 |
| Academia.edu | Is Profile Fake? | Random | 18 | 3 | 0 |
| Academia.edu | Is Profile Spammer? | J48 | 15 | 5 | 2 |
| Academia.edu | Is Profile Spammer? | Random | 18 | 0 | 0 |
| Google+ | Is Profile Fake? | J48 | 48 | 45.5 | 17 |
| Google+ | Is Profile Fake? | Random | 49 | 35.5 | 10 |
| Google+ | Is Profile Spammer? | J48 | 48 | 43 | 16 |
| Google+ | Is Profile Spammer? | Random | 49 | 17 | 4 |
| Google+ | Is Following Specific Gender? | J48 | 48 | 18.5 | 2 |
| Google+ | Is Following Specific Gender? | Random | 49 | 14.5 | 0 |

The differences are due to the special characteristics of each of the social networks and their users.

In Academia.edu, 46.6% of the 15 profiles, flagged by the proposed detection process, were not "legitimate", while none of the profiles in the control group were flagged as such. In Google+, which has a medium anonymity level, 35.4% in the flagged group and 20.4% of the control group were suspected of being fake. Moreover, almost 33.3% of the profiles returned by the proposed process were considered to be spammers, compared with only 8.1% in the control group.

In AnyBeat, which is a relatively new network with a high level of anonymity, the proposed detection process detected fake profiles in 31.8% of the flagged profiles, while the control group contained only 20%. The proposed detection process also detected users who were interested in specific gender. In AnyBeat, users are encouraged to meet new people. The users of this social network are encouraged to behave somewhat like social bots, a fact that makes the detection task more difficult.

Figure 3:
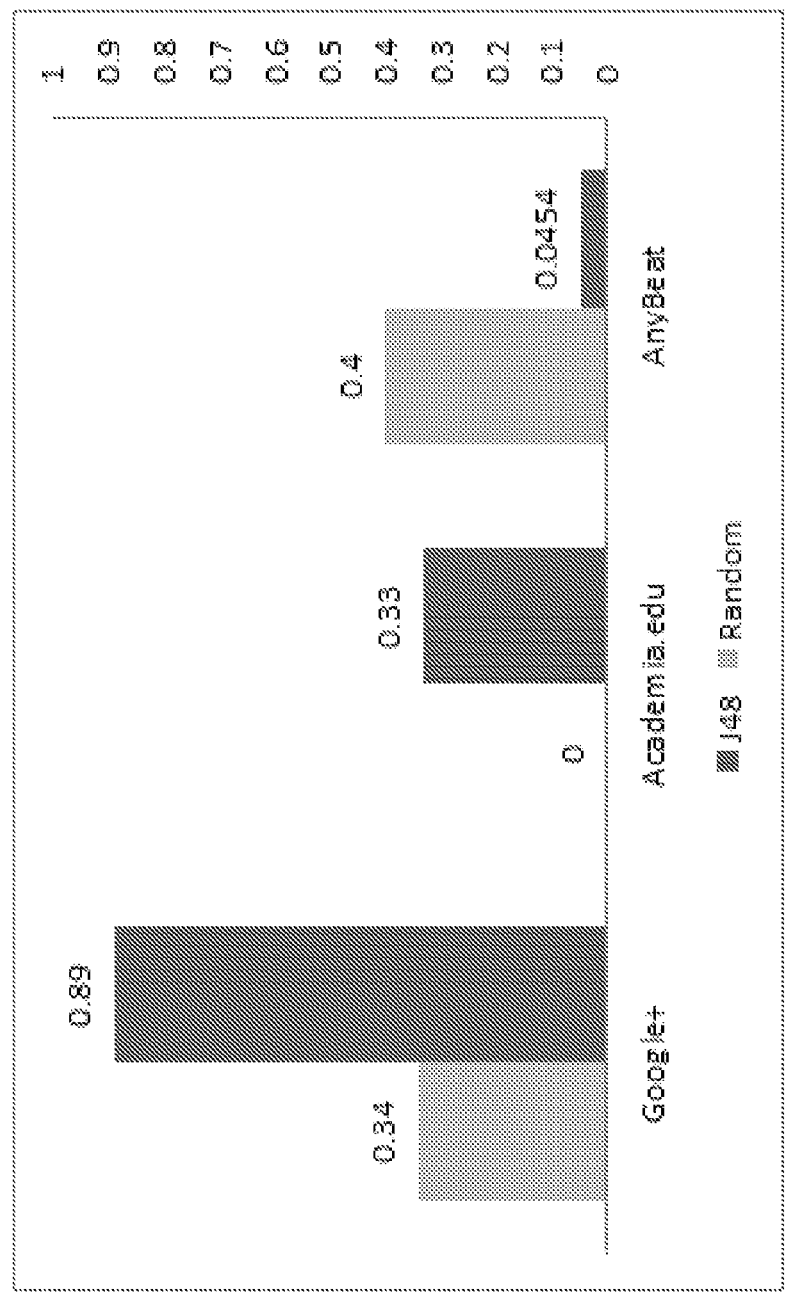
FIG. 3 shows the average spam Profiles' scores.

The proposed detection process uses a combination of graph theory algorithms and machine learning in order to detect these types of users, by using only the graph topology structure. FIG. 3 shows the average spam profiles' scores for a decision tree (J48) classifier and random selection.

Figure 4:
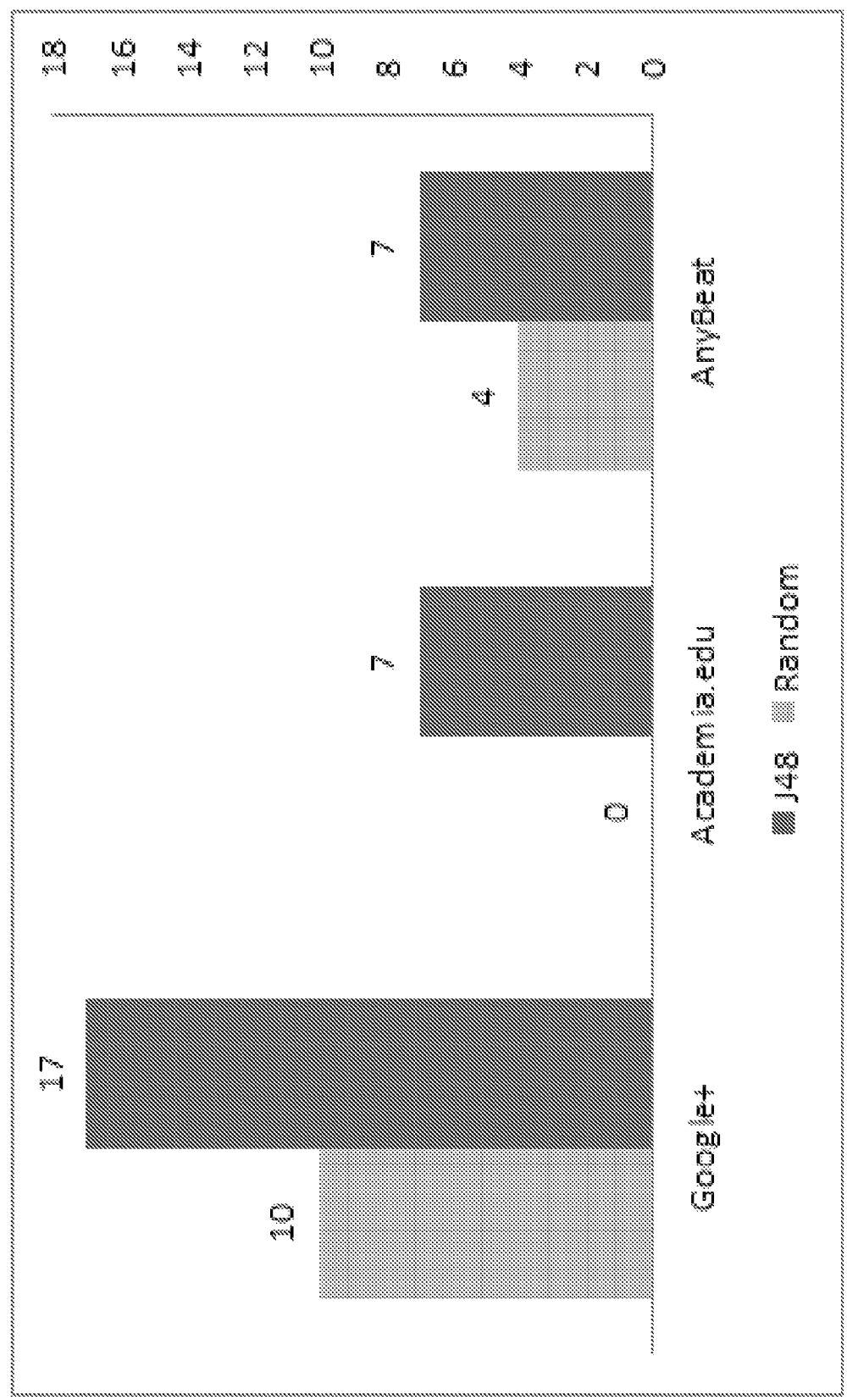
FIG. 4 shows the number of Profiles with high fake score (greater than or equal to 1.5)

The proposed algorithm was tested on three different directed online social networks, each with a different level of anonymity. FIG. 4 shows the number of profiles with high fake score (greater than or equal to 1.5) for a decision tree (J48) classifier and random selection.

Figure 5:
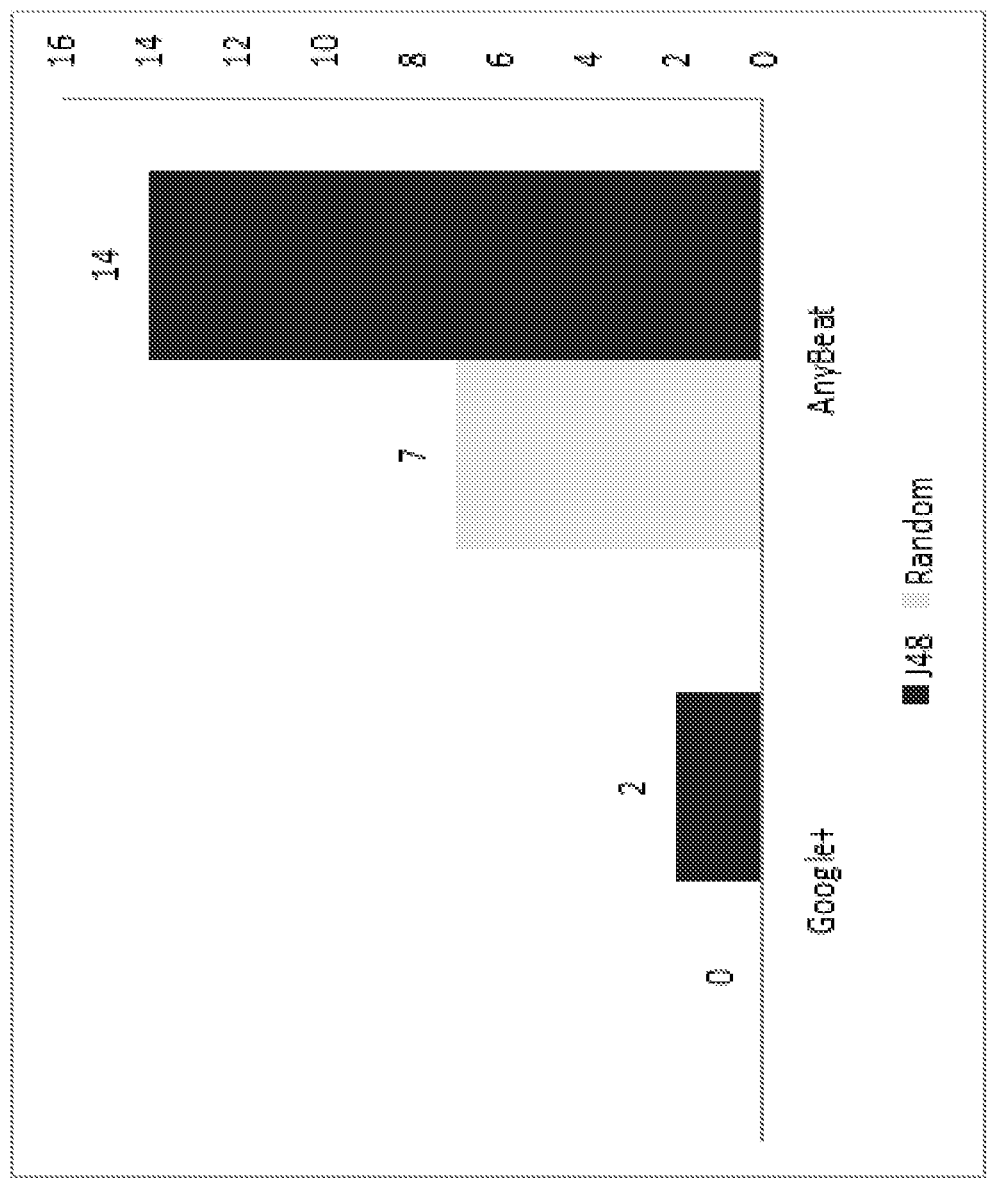
FIG. 5 shows a diagram with the number of profiles with high "Following Same Gender" score (greater than or equal to 1.5).

FIG. 5 shows a diagram with the number of profiles with high "Following Same Gender" score (greater than or equal to 1.5) for a decision tree (J48) classifier and random selection.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A method for protecting user privacy in an online social network, comprising the steps of:
   a) providing a database storing profiles of existing users of said social network;
   b) installing, on a non-transitory computer readable medium of a hardware processor, used to control a computer being connected to said social network, a community detection module, for splitting said social network into communities and extract features from each community;
   c) choosing, by said community detection module, positive examples of legitimate profiles from said database;
   d) choosing, by said community detection module, negative examples of fake profiles using simulation of fake profiles infiltration which is done automatically by said computer;
   e) extracting, by said community detection module, a predetermined set of features for each chosen fake and legitimate profile by dividing the friends or followers of the chosen examples to communities and analyzing the relationships of each node inside and between said communities; and
   f) constructing and training classifiers that can detect other existing fake profiles according to their features, using a supervised machine learning software module, installed on said computer.

2. A method according to claim 1, wherein fake profiles in the social network is identified representing said social network as a directed graph.

3. A method according to claim 1, wherein positive fake profile examples are obtained by using random friend requests.

4. A method according to claim 1, wherein negative examples of fake profiles are obtained by randomly choosing legitimate profiles from said social network.

5. A method according to claim 1, wherein the classifiers are trained for each of the positive and negative example generating a features vector for each user profile.

6. A method according to claim 5, wherein features vectors are used as a training set for the fake profiles detection classifiers.

7. A method according to claim 1, wherein a subset of the most likely fake profiles is manually evaluated, while using a set of randomly selected profiles as a control group.

8. A method according to claim 1, wherein simulation of fake profiles infiltration in a directed social network is performed by:
   a) representing the topology of said directed social network by a directed graph;
   b) inserting new nodes to said graph, each of which representing a fake profile; and
   c) inserting each fake profile into said graph by simulating sending a series of "follow" requests to random users on said directed social network, while limiting the number of friend requests that can be sent by each fake profile.

9. A method according to claim 5, wherein a set of features is extracted for each user, said set consisting of:
   a) the number of friends of said user;
   b) the number of communities said user is connected to;
   c) the number of connections between the friends of said user; and
   d) the average number of friends inside each of the user's connected communities.

10. A method according to claim 1, wherein fake profiles detection classifiers are constructed by:
    a) automatically creating a subset of positive and negative examples with different sizes from each social network;
    b) for each social network, removing users having a number of friends which is smaller than a predetermined value; and
    c) randomly choosing negative examples from each social network.

* * * * *